(No Model.)
W. F. CROWELL.
WHEEL FOR VEHICLES.
No. 261,314. Patented July 18, 1882.
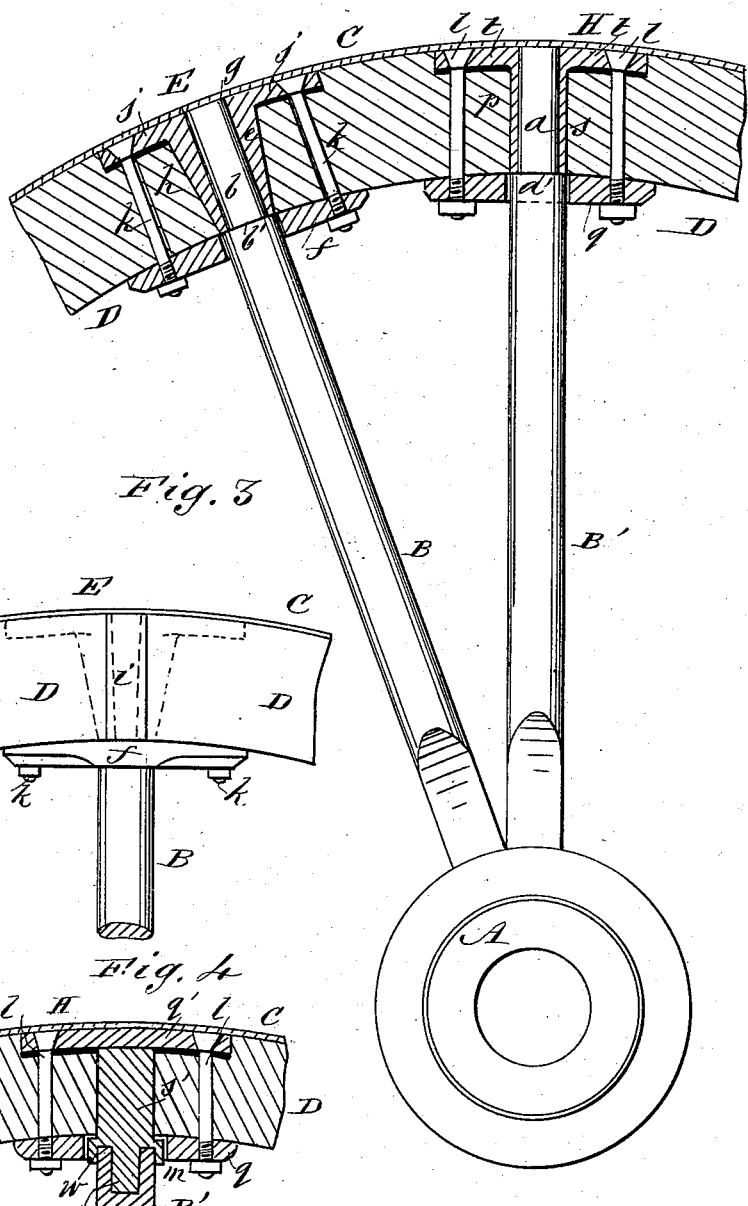
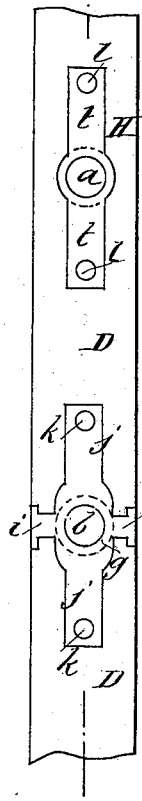
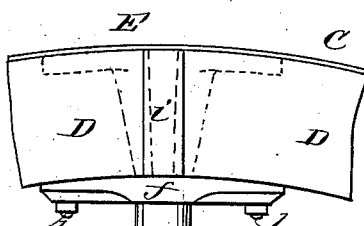
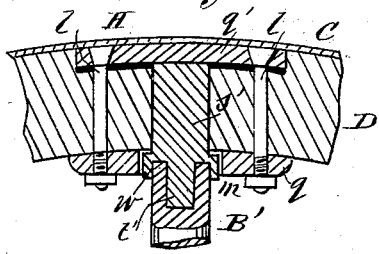
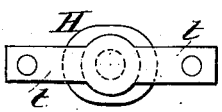
WITNESSES:
C. Neveux
C. Sedgwick
INVENTOR:
W. F. Crowell
BY Munn & Co
ATTORNEYS.

UNITED STATES PATENT OFFICE.

WILLIAM F. CROWELL, OF LAS VEGAS, TERRITORY OF NEW MEXICO.

WHEEL FOR VEHICLES.

SPECIFICATION forming part of Letters Patent No. 261,314, dated July 18, 1882.

Application filed May 20, 1882. (No model.)

*To all whom it may concern:*

Be it known that I, WILLIAM F. CROWELL, of Las Vegas, in the county of San Miguel and Territory of New Mexico, have invented a new and Improved Wheel for Vehicles, of which the following is a full, clear, and exact description.

The object of my invention is to provide wheels for vehicles having such construction that any wear or shrinkage of the wheel may be taken up or compensated for without removing and resetting the tire.

My invention consists in providing the felly and the spokes of the wheel at the joints or ends of the sections of the felly with a device for expanding the felly and settling the spokes into the hub, and providing the spokes and sections of the felly between the joints or ends of the sections with a device for settling such spokes into the hub.

My invention also consists of the above-mentioned felly-expanding and spoke-tightening devices, and of the special construction, arrangement, and combination of the parts of the same, all as hereinafter fully described.

Reference is to be had to the accompanying drawings, forming part of this specification, in which similar letters of reference indicate corresponding parts in all the figures.

Figure 1 is a sectional elevation taken on the line *x x* of Fig. 2, showing a part of the felly, spokes, tire, and the hub of a wheel made in accordance with my invention. Fig. 2 is a plan view of a part of the felly. Fig. 3 is a detailed side elevation of the wheel, showing the felly-expanding and spoke-tightening device placed in the felly and upon the end of the spokes at the joints of the sections of the felly. Fig. 4 is a detailed sectional elevation, showing a modification of the spoke-tightening device that goes in the felly and on the spokes between the ends of the sections of the felly. Fig. 5 is a plan view of the said last-mentioned device removed from the felly, and Fig. 6 is a plan view of the plate that goes on the spokes and upon the under side of the felly.

The hub A, spokes B B', and the tire C of the wheel are of the ordinary construction. D D represent the sections of the felly. At the ends of these sections, where they are joined to make the continuous felly, they are cut out so as to fit against and make a good joint with the sides of the spoke-tightening and felly-expanding device E, whatever its exterior form may be, as will be clearly understood from Figs. 1 and 2. H represents the spoke-tightening device fitted in the sections between the ends thereof, and by preference upon the outer ends of all of the spokes B in the wheel, which spokes are intermediate between the ends of the sections of the felly. The device E will by preference be placed upon each one of the spokes B which come at the joints of the sections D D of the felly. This felly-expanding and spoke-tightening device E is composed of two main parts—the casting *h* and the plate *f*. The part *h* is composed of the main part *e*, which is tapering, or by preference made conical, and formed with the central hole, *g*, to receive the tenon *b* of the spoke, the side extensions, *i i*, which are by preference T-shaped, as shown in Fig. 2, for holding the ends of the sections D D, and the extended plates *j j*, which fit in recesses made in the outer surfaces of the felly-sections at the ends, and are perforated for the passage of the bolts *k k*, which pass through the felly and plate *f* and bolt the main parts *h* and *f* of the device together and secure them in place in the felly. These bolts also hold the ends of the felly-sections in place in and against the T-shaped side extensions, *i i*, thus completing the joint. The conical part *e* of the casting *h* is of such length relative to the thickness of the felly that its smaller end is adapted, when the casting is in place, to rest upon or near to the shoulder *b'* of the spoke, as shown in Fig. 1. The plate *f* is a plain plate, formed with the central aperture, *f'*, adapting it to be placed upon the spoke and to be secured upon the under side of the felly by the bolts *k k*, as shown in Figs. 1 and 3.

The spoke-tightening device H is composed of two main parts—the casting *p* and the plate *q*, which plate is in all respects precisely similar to the plate *f* of the felly-expanding and spoke-tightening device E, and is applied in the same manner and serves a similar purpose. The casting *q* is formed with the tube or sleeve *s*, which receives or fits upon the tenon *a* of the spoke B', and when in place rests near to or upon the shoulder $a'$ of the spoke, as shown in Fig. 1, and is formed with the extensions $t\ t$, which rest in recesses formed in the outer surface of the felly. These extensions are perforated for the passage of the bolts $l\ l$, which pass through the felly and the ends of the plate $q$ and secure the casting $p$ and said plate together and in place upon the felly.

The plates $j\ j$ and side extensions, $i\ i$, of the felly-expanding device E and the plates $t\ t$ of the spoke-tightening device H fit in recesses in the fellies, of greater depth than the thickness of the said plates and side extensions to permit the plates of the devices E H to be respectively drawn together by their bolts $k\ l$.

Instead of forming the spoke-tightening device as shown in Fig. 1 and as just described, I may use the solid bolt $s'$, formed with the smaller portion $t'$, which goes into the end of the spoke, and with the collar or cup $w$, which surrounds the end of the spoke, as shown in Fig. 4, to prevent it from splitting. This bolt is to be used with the plate $q$ and the perforated and slightly-curved plate $q'$, which is let into the felly.

The lower end of the sleeve $s$ of the device H and the lower end of the casting $e$ of the device E may also be cupped to receive or fit upon the shouldered portion of the spokes, as shown at $m$ in Fig. 4, if desired, to prevent all danger of the shouldered part of the spokes splintering off when the nuts on the bolts $k$ and $l$ are turned for expanding the felly and tightening the spokes. In this case the central opening through the plates $f$ and $q$ will be enlarged to surround the collar, as shown in Fig. 4.

When the nuts of the bolts $k\ k$ are turned up the action of the felly-expanding and spoke-tightening device E will be as follows: It will be understood, first, that these nuts will not require turning until the tire or spokes have become somewhat loose from shrinkage or wear. The shrinkage or wear of the felly will leave a space between the felly and tire, so that the sections of the felly may be moved outwardly or radially by the approach of the parts $h$ and $f$ and the action of or their action upon the conical casting $e$. The sections will also receive from the conical casting $e$ an expanding or endwise movement. This radial and endwise movement of the sections will continue until the felly fills the tire. At this time the felly will form a fixed abutment for the plate $f$, so that upon still further turning the nuts the casting $h$ of the device will be drawn toward the said plate, causing the same, by reason of its lower end resting upon the shoulder $b'$, to settle the spoke B into the hub, and at the same time compensating for any wear at the outer end of the spoke, thus tightening both the felly and spoke. Upon turning the nuts of the bolts $l\ l$ of the spoke-tightening device H the action of the parts thereof upon the spoke $B'$ will be the same as that of the parts of the device E upon the spoke B—that is, the felly furnishes at the outset a fixed abutment for the plate $q$, so that when the nuts are turned the sleeve or tube $s$ or $s'$ will be forced down upon the shoulder $a'$ of the spoke, and the spoke will thus be settled into the hub and tightened.

It will be understood that with the device E, in case the spoke to which it is applied is not worn at the outer end or loose in the hub, the shoulder of the spoke may furnish at the outset a rigid abutment for the casting $e$, so that upon turning the nuts of the bolts $k\ k$ only the sections of the felly will be moved.

The above description of the action of the parts of the device E is based upon the supposition that the force at first required to move the sections of the felly will be less than that required to move the spoke in case the spoke is worn or loose. In case the preponderance of resistance should be the reverse of this the movement of the parts will be relatively changed, as the first movement will be in the direction of least resistance, which will continue until a point of equilibrium of resistance has been reached, when the parts $h$ and $f$ will move simultaneously toward each other until the felly becomes fixed against the tire or spoke in the hub. The movement then will be away from the fixed part, felly, or hub, as the case may be.

To permit the lateral and endwise movement of the sections D D of the felly, the holes therein through which the bolts $k\ k$ pass should be made slightly larger than the bolts.

Having thus fully described my invention, I claim as new and desire to secure by Letters Patent—

1. A wheel for vehicles having spoke-tightening and felly-expanding devices placed at the ends or joints of the sections of the felly upon the ends of the spokes passing through the felly at the said joints, and having spoke-tightening devices placed in the felly upon the spokes intermediate between said joints, substantially as described.

2. The spoke-tightening and felly-expanding device E, consisting of the parts $h$ and $f$, the part $h$ being cast with the hollow conical portion $e$ and extensions $j\ j$, substantially as shown and described.

3. The part $h$ of the device E, having the hollow conical portion $e$, T-shaped side extensions, $i\ i$, and extending plates $j\ j$, in combination with the plates $f$ and bolts $k\ k$, as and for the purposes set forth.

4. The spoke-tightening device H, consisting of the part $p$ and the plate $q$, the part $p$ being formed with the tube or sleeve $s$, substantially as described.

5. The part $p$ of the device H, formed with the tube or sleeve $s$ and the extensions $t\ t$, in combination with the plate $q$ and the bolts $l\ l$, substantially as described.

WILLIAM F. CROWELL.

Witnesses:
C. E. LYTTON,
A. W. KOOGLER.